June 6, 1933. A. W. FREHSE 1,913,156
INTERNAL BAND BRAKE
Filed Aug. 15, 1930 2 Sheets-Sheet 2
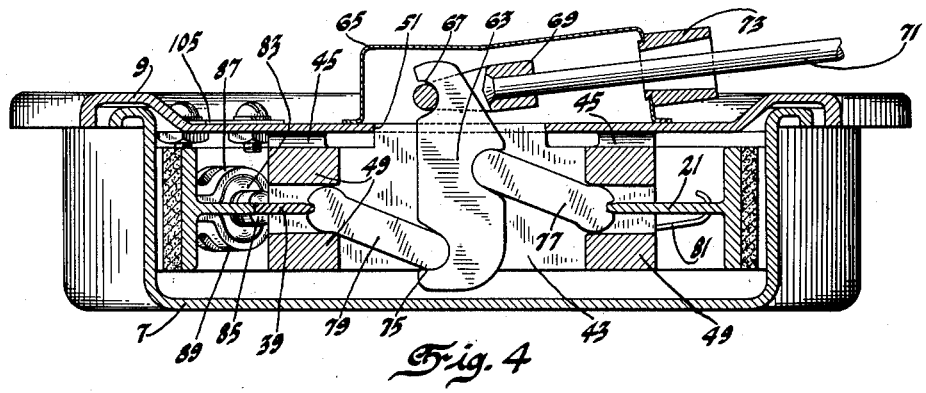
Fig. 4
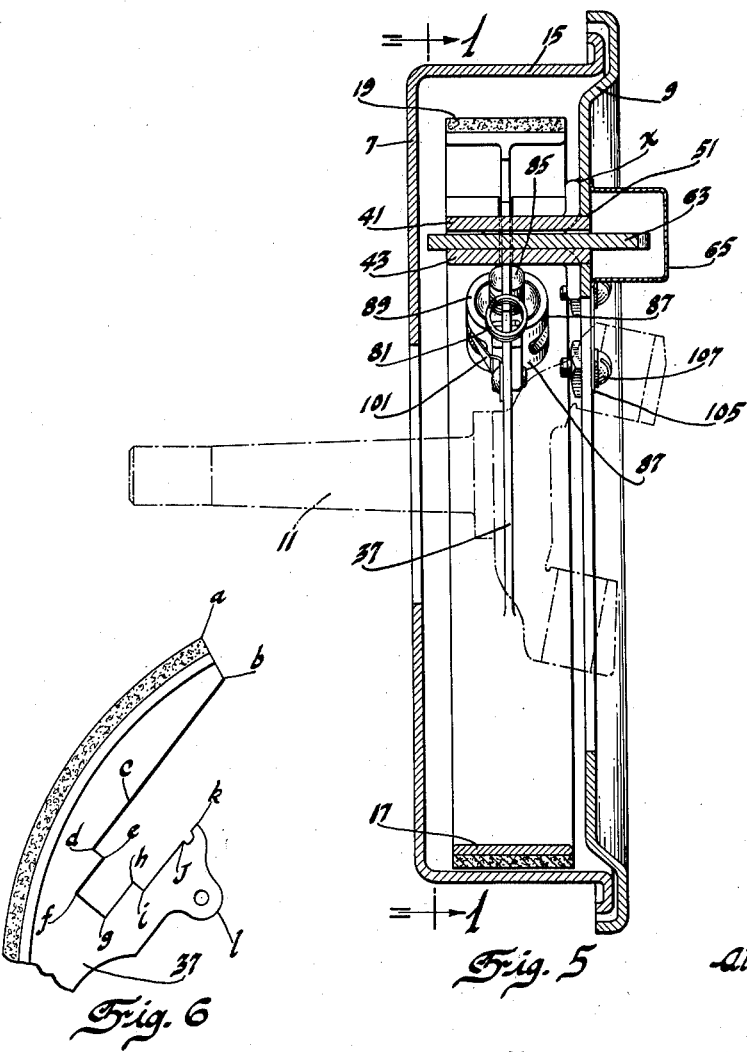
Fig. 5
Fig. 6
Inventor
Albert W. Frehse Patented June 6, 1933

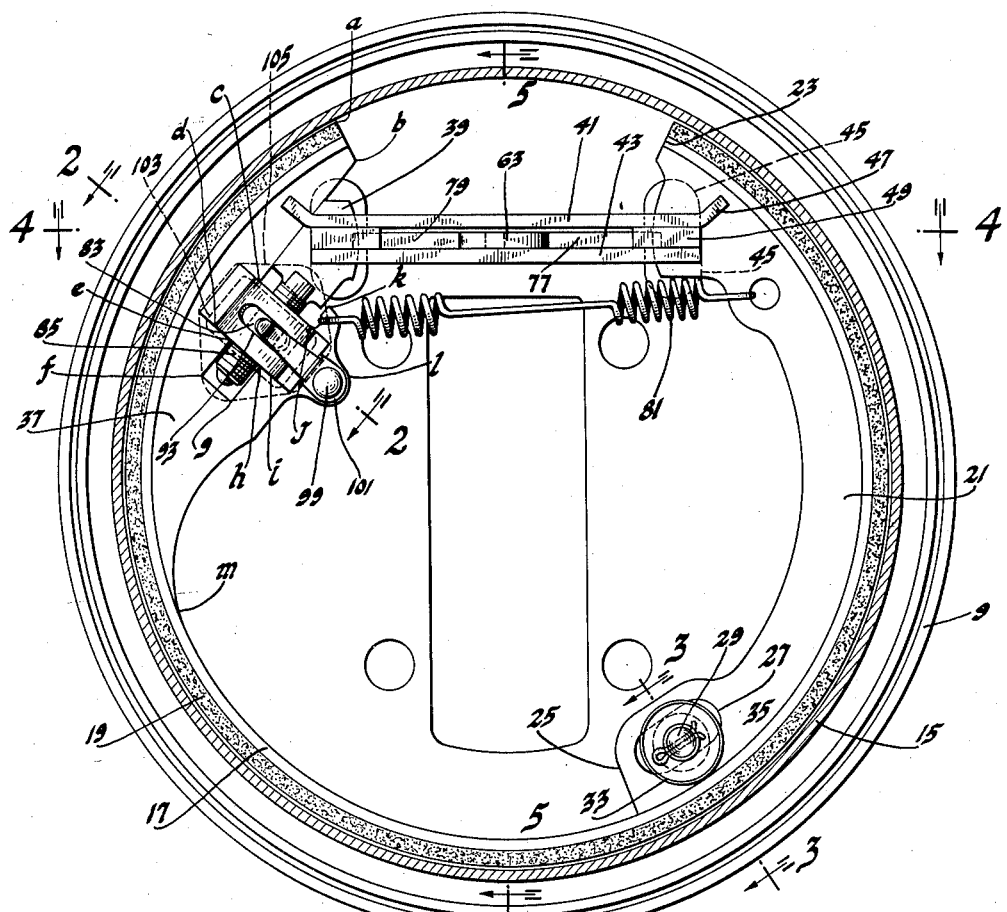

1,913,156

UNITED STATES PATENT OFFICE

ALBERT W. FREHSE, OF DETROIT, MICHIGAN, ASSIGNOR TO GENERAL MOTORS CORPORATION, OF DETROIT, MICHIGAN, A CORPORATION OF DELAWARE

INTERNAL BAND BRAKE

Application filed August 15, 1930. Serial No. 475,551.

This invention relates to brakes and has been designed as an improved internal expanding brake for use on vehicles.

An object of the invention is to produce an internal expanding type of brake which shall be full wrapping, and which shall be comparatively inexpensive to manufacture.

A further object is to make use of inexpensive stampings to as great an extent as possible.

As an additional object the invention provides a novel and inexpensive brake-applying mechanism.

As another object the invention provides a simple and inexpensive adjusting expedient to compensate for lining wear.

Other objects and advantages will be understood from the following description:

In this description reference will be made to the accompanying drawings in which—

Fig. 1 is a view in section on line 1—1 of Fig. 5 showing the brake mechanism in elevation.

Fig. 2 is a section on line 2—2 of Fig. 1.
Fig. 3 is a section on line 3—3 of Fig. 1.
Fig. 4 is a section on line 4—4 of Fig. 1.
Fig. 5 is a section on line 5—5 of Fig. 1.
Fig. 6 illustrates a detail showing a part of the web of the brake band in elevation.

Referring by reference characters to the drawings, numeral 7 represents the brake drum for which no novelty is being asserted. The more or less conventional fixed or backing plate is represented by numeral 9. The drawings show the backing plate carried by the steering knuckle associated with a front wheel spindle 11. The front wheel which is to be rotatably mounted on the spindle and which carries the brake drum 7 is not illustrated.

The brake member which is to frictionally engage the flange 15 of the drum and retard its rotation is a band 17 having a lining 19. The brake band has a reinforcing web 21 extending from one end 23 to a point 25 between the said end and its mid point. Near the end of this web adjacent the extremity 25 there is a hole 27. At this point pin 29 secured to the backing plate 9 extends through the hole 27. The hole is elongated to permit a circumferential movement of the band, whereby it may anchor at either end as is customary in self-wrapping brakes operable in either direction of vehicle travel. Surrounding the pin 29 within the drum is a spring 31 engaging the backing plate at one end and the web 21 at its other end. To limit the movement of the web 21 away from the backing plate 9, a disc or washer 33 surrounds the pin on the side of the web 21 remote from the spring, and this disc is held by a suitable fastening means 35. By this expedient the band is free to move circumferentially to accommodate self-wrapping and also it is held horizontally away from contact with the backing plate.

A second stiffening web 37 is provided on the other end of the band. Slidable along the end of web 37 is an abutment plate 39. This plate 39 together with the web 21 receives the manually applied force to cause the frictional engagement between the band and the drum.

The structural elements for applying the brake are as follows:

Two plates 41 and 43 are positioned in spaced relation to each other and at right angles to the backing plate. These plates may be provided with bent fingers 45 which are to be secured to the backing plate as shown at x in Fig. 5. The uppermost of these plates, plate 41, has angular ends as shown at 47. These plates 41 and 43 are preferably positioned horizontally and their ends are slotted to receive at one end the web 21 and at the other end the sliding abutment plate 39. At the last mentioned end the upper angular end of plate 41 also engages the sides of web 37 as well as of plate 39, and thus aids in maintaining these parts in coplaner relationship. The two plates 41 and 43 are maintained in spaced relation by spacers 49.

Between the two plates 41 and 43 and resting on the lower, and extending outwardly through an opening 51 in the backing plate is a lever 63. Housing the outer end of the lever is a stamped enclosure 65 secured in any convenient way to the backing plate. The lever has a recess or notch 67 in the outer end to engage the eye of a fitting 69. From the fitting and secured thereto extends an operating element 71 preferably in the form of a flexible cable. This member 71 extends through a sleeve 73 suitably secured to the enclosure 65. The cable or operating member 71 is to be attached to any preferred form of brake operating linkage.

The lever 63 is not positively pivoted but is supported as a floating lever upon plate 43. It has two spaced recesses 75, one on either side of the intersection of the plane of the web 21 with the lever. These recesses receive appropriately shaped ends of links 77 and 79. The outer end of each of these links has a notch to receive, in one instance the web 21 and in the other instance the abutment plate 39. It will be seen that the abutment plate 39 is held from any other motion than that of sliding on the edge of web 37 by the engagement described between the link 79 and the plate 39, and also by the engagement of the upper plate 41 with the web 37 and the plate 39. The floating mounting of the lever not only provides a simple method of supporting the lever but also provides an equalized pressure between the two ends of the brake band. It will be observed that the parts including the plates 41 and 43 and the lever and the links constitute an efficient and inexpensive brake operating mechanism.

The provision for adjusting the abutment plate relative to the web 37 to take up undue clearance will next be described. It will be seen that if the adjustment plate be moved toward the end of the web 37 that, owing to the fixed position of the operating mechanism a reaction will occur pushing the end of the band having the web 37 outwardly and reducing the clearance of the brake band. The end of the web 37 has the configuration shown in Fig. 6. This may be described as follows:

The inner boundary of web 37 extends from a point $a$ at the end of the shoe to point $b$ in a substantially radial direction. From $b$ the boundary line extends as a cord of the circle to a point $c$ and continues in the same straight line to a point $d$. From $d$ the boundary extends in a line at a substantially right angle to line $c-d$ to a point $e$. It then extends angularly to points $f$, $g$ and $h$ as shown. at $h$ the boundary makes another right angle and extends a short distance to $i$ such that the line $h-i$ constitutes an extension of the line $d-e$ and is substantially equal to line $d-e$. With another right angle at $i$ the boundary line extends to $j$, the line $i-j$ being parallel with and equal to $c-d$. From $j$ the boundary extends to $k$, there being a notch in the line $j-k$ to receive one end of the retracting spring 81, the other end of which is connected to the other end of the band as shown in Fig. 1. From $k$ the boundary line curves inwardly to a point $l$ and thence curves outwardly and away from the end of the band to a point $m$ where it merges into the surface of the band.

Within the opening in web 37 defined by boundary lines $c-d$, $d-e$, $h-i$, and $i-k$, is a nut 83. The opening provided is such as to hold the nut from radial movement in a manner which will be obvious from an inspection of the drawings. It is also held in one direction from axial movement by engagement with the web along the lines $d-e$ and $h-i$. Threaded in the nut is a screw or bolt 85 one end of which is received for movement axially in the open space defined by lines $e-f$, $f-g$, and $g-h$. Two hollow stampings 87 and 89 engage the opposite sides of the web 37 and enclose the nut and the bolt in the position described. These stampings have flanges 91 which are welded as at $x$ to the web 37. They also have arc-shaped slots 93 and 95. The nut has several radial openings 97 for the reception of a tool projected through slot 93 whereby the nut may be turned to positions of adjustment. A rivet 99 secured to the web 37 holds a flat spring 101 urged by inherent resiliency inwardly, so that its end extends through slot 95 of plate 89 and snaps into one of the openings of the nut to hold the nut in adjusted position.

To afford access to the adjusting nut the backing plate has an opening 103 normally covered by a plate 105 held by fastening means 107. In Fig. 1 the shape of this cover plate will be readily seen, which figure also shows in dotted lines the outline of the opening 103.

At the end of screw 85 it is formed with a slot, the furcations which engage the opposite faces of plate 39, this being the plate which is designed to slide along the adjoining edge of web 37 as explained above.

It will be seen that the rotation of the nut causes the reciprocation of the screw and also reciprocation of the abutment plate 39. Since the brake-applying means is in engagement with abutment plate 63 it will be understood that if the nut be turned in a direction to move plate 39 upwardly and to the right there results a reaction by which the end of the band moves outwardly and reduces the clearance between itself and the drum. It is thus that adjustment is effected to provide for lining wear.

Among the advantages of the above described construction may be mentioned the following:

The parts are made up largely of inexpensive stampings and are easily assembled. The band is positioned by the simple expedient shown in Fig. 3 at one point and by the guidance provided for its webs by the slotted plates 41 and 43. The horizontal plates also support the operating mechanism.

The adjustment is easily made from the outside by means of a tool entered through the opening 103. Rotation of the nut causes the reciprocation of the screw and abutment plate 39, which latter because of its relationship to fixed plates must reciprocate and is unable to turn. When the brake is applied it will be understood that either the web 21 or the abutment plate 39 takes for its anchorage abutment the inner end of the slots in plates 41 and 43. Whatever circumferential movement of the band is required is provided for by the slot 27. A full-wrapping inexpensive and easily assembled internal brake is therefore brought about by the construction described.

I claim:

1. In a brake, a drum, a band having adjacent one end a web with parallel sides and an edge extending as a cord of the brake drum, an abutment plate slidable along said edge, means carried by said web and manually manipulable to effect said sliding movement.

2. The invention defined by claim 1, said last-named means comprising a rotatable nut and a screw reciprocable by rotation of the nut, said screw and abutment plate directly interengaged to prevent relative rotation, and means to prevent rotation of said plate with said screw about the axis of said screw.

3. The invention defined by claim 1, said web having an opening, and said last-named means including a nut fitted within said opening and a screw axially reciprocable by rotation of said nut, said screw operatively connected to said abutment plate to prevent relative rotation therebetween, and mechanism to prevent rotation of said plate together with said screw about the axis of said screw, said mechanism comprising a plate fixed in position and having terminal parts engaging both said web and said abutment plate.

4. In combination, a brake drum, a backing plate, a pair of horizontally located vertically spaced plates secured to the backing plate, a brake band to frictionally engage the drum, said brake band having radial webs, a lever floatingly mounted on one of said horizontal plates, and links operably connected to said lever and to the ends of said band.

5. The invention defined by claim 4, one or more of said horizontal plates slidably engaging the radial webs of said band to position and guide the same.

6. The invention defined by claim 4, one or more of said horizontal plates slidably engaging the radial webs of said band to position and guide the same, together with a slidable abutment plate adjacent one end of said band, one of said horizontal plates slidably engaging both said abutment plate and the adjacent web to maintain said abutment plate in position.

7. The invention defined by claim 4, one or more of said horizontal plates slidably engaging the radial webs of the band to position and guide the same, a slidable abutment plate adjacent one end of said band, one of said horizontal plates slidably engaging both said abutment plate and the adjacent web to maintain said abutment plate in position, together with movable means between said plates operably engaging the web at one end of the band and the abutment plate at the other end of the band to effect frictional engagement of said band with said drum.

8. In a brake, a drum, a brake member to engage the drum, a floating lever, a manually operable connection to swing said lever in a plane determined by a cord of the drum and a line parallel to its axis, and mechanism operably connecting said lever with the ends of the brake mechanism together with a backing plate closing said drum, a plate secured to said backing plate for supporting said lever.

9. In a brake, a drum, a brake member to engage the drum, a floating lever, a manually operable connection to swing said lever in a plane determined by a cord of the drum and a line parallel to its axis, and mechanism operably connecting said lever with the ends of the brake mechanism together with a backing plate closing said drum, a pair of spaced plates secured to said backing plate, one of said spaced plates supporting said lever, and said spaced plates jointly engaging and guiding the ends of said brake member.

10. In a brake, a drum, a brake member to engage the drum, a floating lever, links between said lever and the ends of said brake member, one of said ends having an adjustable abutment plate to be engaged by one of said links together with a backing plate, spaced plates secured thereto to support and position said lever and links, said spaced plates also jointly positioning the ends of said brake member and maintain the abutment plate in operable relation to its end of the brake member.

In testimony whereof I affix my signature.

ALBERT W. FREHSE.